United States Patent
Boriskin et al.

(10) Patent No.: US 11,442,198 B2
(45) Date of Patent: Sep. 13, 2022

(54) OPTICAL DEVICE CAPABLE OF PROVIDING AT LEAST TWO DIFFERENT OPTICAL FUNCTIONS

(71) Applicant: InterDigital CE Patent Holdings, SAS, Paris (FR)

(72) Inventors: Artem Boriskin, Thorigné-Fouillard (FR); Oksana Shramkova, Cesson-Sevigne (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 150 days.

(21) Appl. No.: 16/643,792

(22) PCT Filed: Aug. 28, 2018

(86) PCT No.: PCT/EP2018/073156
§ 371 (c)(1),
(2) Date: Mar. 2, 2020

(87) PCT Pub. No.: WO2019/043016
PCT Pub. Date: Mar. 7, 2019

(65) Prior Publication Data
US 2020/0217985 A1  Jul. 9, 2020

(30) Foreign Application Priority Data
Sep. 1, 2017  (EP) .................................... 17306136

(51) Int. Cl.
*G02B 1/00* (2006.01)
*G02B 3/00* (2006.01)
*G02B 27/01* (2006.01)

(52) U.S. Cl.
CPC ........... *G02B 1/002* (2013.01); *G02B 3/0037* (2013.01); *G02B 27/0172* (2013.01); *G02B 2207/101* (2013.01)

(58) Field of Classification Search
CPC .... G02B 2207/101; G02B 1/002; G02B 1/00; G02B 3/0037; G02B 3/0006; G02B 27/0172; G02B 27/017
(Continued)

(56) References Cited

U.S. PATENT DOCUMENTS 9,482,796 B2 * 11/2016 Arbabi ................. G02B 5/1842
2004/0135847 A1   7/2004 Miura
(Continued)

FOREIGN PATENT DOCUMENTS

CN    1502414 A    6/2004
CN  106680985 A    5/2017
(Continued)

OTHER PUBLICATIONS

Genevet, Patrice, et al. "Breakthroughs in Photonics 2013: Flat Optics: Wavefronts Control With Huygens' Interfaces." IEEE Photonics Journal, vol. 6, No. 2, 2014 (5 pages).
(Continued)

*Primary Examiner* — William R Alexander
(74) *Attorney, Agent, or Firm* — Invention Mine LLC

(57) ABSTRACT

An optical device forming an outgoing electromagnetic wave from an incident electromagnetic wave comprises at least one unit cell (UC), comprising: at least two subwavelength optical elements (1, 2), each of them belonging to a different set (MS1, MS2) of subwavelength optical elements, a set of subwavelength optical elements being characterized by a type of optical response to an incident electromagnetic wave; means (21) enabling selective excitation of all subwavelength optical elements belonging to a given set, in response to an electromagnetic wave (20) incident on said unit cell.

20 Claims, 5 Drawing Sheets

(58) Field of Classification Search
USPC ......................................................... 359/640
See application file for complete search history.

(56) References Cited

U.S. PATENT DOCUMENTS

| | | | |
|---|---|---|---|
| 2009/0303154 A1 | 12/2009 | Grbic | |
| 2010/0165464 A1* | 7/2010 | Lin ...................... | G02B 27/123 359/570 |
| 2012/0262787 A1* | 10/2012 | Zeitner ................ | G02B 5/1866 359/558 |
| 2012/0328240 A1* | 12/2012 | Ma ........................ | G02B 1/002 385/33 |
| 2013/0058370 A1* | 3/2013 | Chang-Hasnain ..... | B82Y 20/00 372/50.11 |
| 2013/0208332 A1 | 8/2013 | Yu | |
| 2015/0219806 A1* | 8/2015 | Arbabi ................ | G02B 5/1847 359/573 |
| 2016/0231471 A1* | 8/2016 | Ma ...................... | G02B 3/0037 |
| 2016/0306079 A1* | 10/2016 | Arbabi ............... | G02B 27/0025 |
| 2016/0320531 A1* | 11/2016 | Kamali ............... | G02B 5/0226 |
| 2017/0045652 A1* | 2/2017 | Arbabi ..................... | G02B 7/08 |
| 2017/0146806 A1* | 5/2017 | Lin ...................... | G02B 3/0068 |
| 2017/0212285 A1* | 7/2017 | Arbabi ............... | G02B 27/0056 |
| 2018/0275321 A1* | 9/2018 | Kamali ................ | G02B 1/002 |
| 2018/0299595 A1* | 10/2018 | Arbabi ............... | G02B 27/4277 |
| 2019/0064532 A1* | 2/2019 | Riley, Jr ................ | H01S 5/026 |
| 2019/0086683 A1* | 3/2019 | Aieta ..................... | G02B 1/002 |

FOREIGN PATENT DOCUMENTS

| | | |
|---|---|---|
| CN | 106898407 A | 6/2017 |
| DE | 102009037629 | 2/2011 |
| EP | 3312646 | 4/2018 |
| EP | 3312660 | 4/2018 |
| WO | 2011018240 A1 | 2/2011 |
| WO | 2016140720 A2 | 9/2016 |
| WO | 2016168173 A1 | 10/2016 |
| WO | 2017162881 A1 | 9/2017 |
| WO | 2017162882 A1 | 9/2017 |
| WO | 2018073407 A1 | 4/2018 |
| WO | 2018073426 A1 | 4/2018 |

OTHER PUBLICATIONS

Heifeiz, Alexander, et al., "Photonic Nanojets". Journal of Computational Theoretical Nanoscience, vol. 6, No. 9., (2009), pp. 1979-1992 (14 pages).

Cheng, Hua, et al. "Dynamically Tunable Broadband Infrared Anomalous Refraction Based on Graphene Metasurfaces." 2015 (6 pages).

Genevet, Patrice, et al., "Recent Advances In Planar Optics: From Plasmonic To Dielectric Metasurfaces". Optica, vol. 4, No. 1, Jan. 2017, pp. 139-152 (14 pages).

Ollanik, Adam, et al. "Highly Efficient, All-Dielectric, Transmissive Gradient Metasurfaces from the Ultraviolet to the Infrared". 2016 Conference on Lasers and Electro-Optics (CLEO), 2016, pp. 1-2 (2 pages).

Chu, Cheng Hung, et al. "Optical response of phase change material for metasurface (Conference Presentation)". In: Proc. SPIE, Optical Data Storage, 2016, vol. 9959, p. 99590E. International Society for Optics and Photonic (2 pages).

Achouri, Karim, et al. "Metasurface Diffraction Orders Analysis". 2016, pp. 1081-1082. https://ieeexplore.ieee.org/document/7696248 (2 pages).

Liu, Cheng-Yang, et al. "Enhanced linear photonic nanojet generated by core-shell optical microfibers". Proc. SPIE 10232, 2017. https://www.spiedigitallibrary.org/conference-proceedings-of-spie/10232/1023203/Enhanced-linear-photonic-nanojet-generated-by-core-shell-optical-microfibers/10.1117/12.2264073.short (5 pages).

\* cited by examiner

OPTICAL DEVICE CAPABLE OF PROVIDING AT LEAST TWO DIFFERENT OPTICAL FUNCTIONS

The present application is a national stage application under 35 U.S.C. 371 of International Application No. PCT/EP2018/073156, entitled "OPTICAL DEVICE CAPABLE OF PROVIDING AT LEAST TWO DIFFERENT OPTICAL FUNCTIONS", filed on Aug. 28, 2018, which claims priority to EP Patent Application Serial No. 17306136.7, entitled "Optical Device Capable Of Providing At Least Two Different Optical Functions", filed Sep. 1, 2017, which is hereby incorporated by reference in its entirety.

1. FIELD OF THE INVENTION

The present disclosure relates to the field of optics and photonics, and more specifically to planar optical devices, based on ultrathin optical interfaces also referred to as metasurface devices. It may find applications in the field of conformable and wearable optics (i.e. AR/VR glasses (Augmented Reality/Virtual Reality)), as well as in a variety of other electronic consumer products comprising displays and/or lightweight imaging systems.

2. BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

AR/VR glasses are considered as the next generation human-machine interface, thus raising significant interest of major industrial players in the domain of consumer electronics and mobile devices.

Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

The tradeoff between the image quality and physical size of the optical components motivates research into ultra-compact (preferably subwavelength-size) optical components that can be used as building blocks for more complex optical systems, such as AR/VR glasses.

Conventional volumetric optical components, such as refractive and diffractive microlenses and free-form optical combiners, are bulky and thus do not fully satisfy the needs of eyewear devices.

Alternative solutions, based on different physical principles, are necessary to provide desired performances.

To overcome limitations intrinsic to conventional optical components, a new family of ultra-thin optical devices has recently been proposed, based on optical interfaces comprising plurality of subwavelength-scale optical resonators. This family of devices is also referred as 'flat optics' and 'metasurface' devices.

A metasurface may be defined as an optically thin (i.e. much thinner than the wavelength of an incident electromagnetic wave) array of sub-wavelength size, sub-wavelength spaced optical elements, formed of individual microparticles usually made of metal (e.g. gold) or high-index dielectric material (e.g. silicon), which may act as resonators, optical antennas . . . . Metasurfaces can be either structured or not structured with subwavelength-scaled patterns in the horizontal dimensions.

Metasurfaces may also be defined as a periodic array of scattering elements whose dimensions and periods are small compared with the operating wavelength.

Due to their negligible thickness compared to the wavelength of operation, metasurfaces can (near resonances of unit cell constituents) be considered as an interface of discontinuity enforcing an abrupt change in both the amplitude and phase of the impinging light. One of the most important applications of metasurfaces is hence to control the wavefront of electromagnetic waves by imparting local, gradient phase shift to the incoming waves. They can actually provide an abrupt change of the phase, amplitude, and/or polarization of the incident electromagnetic wave (e.g. visible light).

Moreover, optical response of metasurface devices can be tailored by tuning the shape and size of individual microparticles and/or spacing between them.

Being assembled on or inside a dielectric plate, such optical resonators can provide a collective response required for many optical devices of general interest, such as focusing, beam deflection, and polarization conversion. A few examples of metasurface devices can be found in "*Recent advances in planar optics: from plasmonic to dielectric metasurfaces*", by P. Genevet, F. Capasso et al., Optica 4(1), 139-152, 2017, and are disclosed in FIG. 1.

Although having a very attractive form-factor (ultra-thin and flat shape), all reported metasurface devices operating in the optical range have some limitations, including a poor angular performance. At the same time, a possibility of tuning the optical response of metasurface devices for different incident angles of incoming waves may be of interest for many applications, including AR/VR glasses.

It would hence be desirable to provide an optical device, relying on the use of metasurfaces, which would be an improvement over the prior art. It would also be desirable to provide such an optical device, which would be capable of providing at least two different optical functions for at least two different illumination conditions (notably for at least two different incident angles of the incoming electromagnetic wave).

3. SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to an embodiment of the present disclosure, an optical device, forming an outgoing electromagnetic wave from an incident electromagnetic wave, comprises at least one unit cell, which itself comprises:

at least two subwavelength optical elements, each of them belonging to a different set of subwavelength optical elements, a set of subwavelength optical elements being characterized by a type of optical response to an incident electromagnetic wave;

means enabling selective excitation of all subwavelength optical elements belonging to a given set, in response to an electromagnetic wave incident on said unit cell.

The present disclosure thus relies on a novel and inventive approach of optical devices relying on the use of metasurface devices.

Actually, in most prior art cases, metasurface (MS) devices are based on subwavelength-size nanoparticles (NP) assembled on or inside a dielectric substrate. The particles are assembled in a form of regular one- or two-dimensional arrays with a period smaller than the wavelength of the incident light. The optical response of prior art MS devices is tuned by varying the size, shape and orientation of individual nanoparticles. For any incident angle, an optical response of prior art MS devices is defined by a cumulative response of all NPs.

To provide an additional degree of freedom in tuning the optical response of MS devices, the present disclosure proposes to build a compound metasurface (comprising at least two sets of elements corresponding to at least two metasurfaces, each MS producing an optical response different from the other MS) with means enabling selective excitation of the elements which belong to the two or more different sets.

In other words, a unit cell of the optical device according to embodiments of the present disclosure comprises at least two optical elements, which size and spacing are smaller than the wavelength of an incident electromagnetic wave (for example smaller than $\lambda/2$), also called subwavelength optical elements. These subwavelength optical elements belong to different sets of subwavelength optical elements. All subwavelength optical elements of a same set contribute to the optical response of the device to an incident electromagnetic wave, with a given angle of incidence on the unit cell.

Moreover, such a unit cell comprises means for selectively exciting the subwavelength optical elements of a given set. Such means thus enable at least two different optical responses of the optical device for different angles of incidence of the incoming light. For example, for a first angle of incidence of the incoming electromagnetic wave, it is the subwavelength optical elements of a first set which are excited and thus produce the optical response of the optical device; for a second angle of incidence of the incoming electromagnetic wave, it is the subwavelength optical elements of a second set which are excited and thus produce a different optical response of the optical device. For instance, in one embodiment, two different optical responses may include two different tilts of the incident wave (two different deviation angles with respect to the direction of propagation of the incident wave).

The optical response of the optical device to an incident electromagnetic wave is hence governed by partial contributions of all the subwavelength optical elements of a set, as all elements of a given set are illuminated for a given angle of incidence and simultaneously contribute to the optical response of the device under the given illumination conditions.

The optical device according to embodiments of the present disclosure thus relies on angular-selective metasurface devices capable of providing at least two different optical functions for at least two different illumination conditions. The light propagates through the optical device but the wavefront of the incident wave is reshaped (via local change of the amplitude and/or phase of the incident wave caused by its interaction with different subwavelength elements which belong to the same set). As a result, the outgoing electromagnetic wave may change its propagation direction and/or converge to a focal point, as compared to the incident electromagnetic wave.

According to an embodiment of the present disclosure, a type of optical response belongs to the group comprising:
a phase shift applied to the incident electromagnetic wave;
an amplitude change of at least part of a spectrum of the incident electromagnetic wave.

Hence, all subwavelength optical elements belonging to a same set contribute to the same qualitative optical response of the optical device, although their contribution may be quantitatively different.

They may for example all contribute to applying a phase delay to the incident electromagnetic wave, but with a different order of magnitude, so that phase delay variation along the incident wavefront may be used to tilt or focus the incident plane wave.

A given set of subwavelength optical elements may also act both on the phase delay and on the amplitude of the incident electromagnetic wave.

According to an embodiment of the present disclosure, the means enabling selective excitation of all subwavelength optical elements belonging to a given set are a light guiding element (LGE), and the subwavelength optical elements are targeted to be placed in a focal plane of the light guiding element.

Such a light guiding element ensures a focusing function, and is able to focus light, either on subwavelength optical elements of a set or on subwavelength optical elements of another set, thus selecting the optical function which will be provided by the optical device.

According to an embodiment of the present disclosure, the light-guiding element is a nanojet microlens. It may of course also be any other type of diffractive or refractive lens. However, using a nanojet microlens as Light Guiding Element allows achieving very small sizes of unit cells.

Such nanojet (NJ) microlenses were first presented in PCT patent applications PCT/EP17/057130 and PCT/EP17/057131, which have not been published yet at the time of filing the present patent application. They can produce condensed optical beams in the near-zone (so-called nanojet beams), whose length and half power beam width (BWHP) can be tined by varying lens material, shape, and size. As a complement to the NJ beam formation, NJ microlenses can also produce a quiet zone, which is a zone characterized with very low field intensity values, much lower than that of the incident wave. As a consequence, the subwavelength optical elements of the unit cell which are reached by the nanojet beam are excited, and provide their optical response, while the subwavelength optical elements of the unit cell which are in the quiet zone are not excited, and do not contribute to the optical response of the optical device.

Such nanojet microlenses may have different shapes and may be targeted to be cylinders, prisms, cones with arbitrary cross-section . . . .

According to an embodiment of the present disclosure, the subwavelength optical elements belong to the group comprising:
metallic particles;
dielectric particles;
semiconductor particles;
optical resonators;
optical antennas.

According to an embodiment of the present disclosure, the subwavelength optical elements are assembled on or inside a dielectric substrate.

According to a first peculiar embodiment of the present disclosure, the nanojet microlens is a nanojet microlens embedded in the substrate and made of a dielectric material with refractive index higher than that of the substrate.

In an embodiment, the nanojet microlens is placed at a distance below a surface of the substrate on which the subwavelength optical elements are assembled, such that H+T=F, where H is the height of the NJ microlens, T is the distance from the top of the NJ microlens to the surface, and F is the focal length of the microlens.

According to a second peculiar embodiment of the present disclosure, the substrate comprises at least one cavity filled with a medium with refractive index lower than that of the substrate and the nanojet microlens is formed in the same material as the substrate and has a focusing function enabled by a step of refractive index induced by an edge of the cavity(ies).

According to a third peculiar embodiment of the present disclosure, the nanojet microlens is attached to a surface of the substrate opposite to a surface of the substrate on which the subwavelength optical elements are assembled, and the optical device comprises a host medium surrounding the nanojet microlens and having a refractive index lower than that of the nanojet microlens.

According to a fourth peculiar embodiment of the present disclosure, the nanojet microlens forms the substrate on a surface of which the subwavelength optical elements are assembled.

According to a further embodiment, such an optical device comprises a one-dimensional or two-dimensional array of unit cells.

Hence, such an optical device comprises a compound metasurface (CMS) comprising at least two subwavelength optical elements arrays assembled on or inside the same dielectric substrate, which elements alternate in the plane of the array. The subwavelength optical elements arrays can be one-dimensional (1D) or two-dimensional (2D), thus having periodicity in one or two planes.

According to yet a further embodiment, the unit cells of the array of unit cells comprise subwavelength optical elements belonging to the same sets of subwavelength optical elements but which are not identical.

Actually, the elements of each subwavelength optical elements array may not obviously be identical, as long as they belong to the same set of subwavelength optical elements, characterized by its type of optical response. For instance, the subwavelength optical elements can be metallic strips having different shape and orientation, or sub-wavelength dielectric cylinders with a circular or rectangular cross-section having variable size and/or orientation. They may also have a form of strips creating 1D array.

According to a further embodiment, such an optical device belongs to an eyewear optical device or a display device.

Actually, compound metasurfaces may enable more sophisticated angular-selective optical responses wanted for the next generation of eyewear optical devices.

4. BRIEF DESCRIPTION OF THE DRAWINGS

The present disclosure can be better understood with reference to the following description and drawings, given by way of example and not limiting the scope of protection, and in which:

FIG. 1 provides examples of metasurface devices according to the prior art;

FIG. 2A gives a schematic drawing of the side view of a prior art metasurface device of FIG. 1;

FIG. 2B illustrates a compound metasurface comprising two nanoparticle arrays;

FIG. 2C provides a schematic drawing of an optical device according to an embodiment of the present disclosure;

FIG. 3 provides a schematic drawing of the simplest form of the optical device of FIG. 2C;

Figure 7:
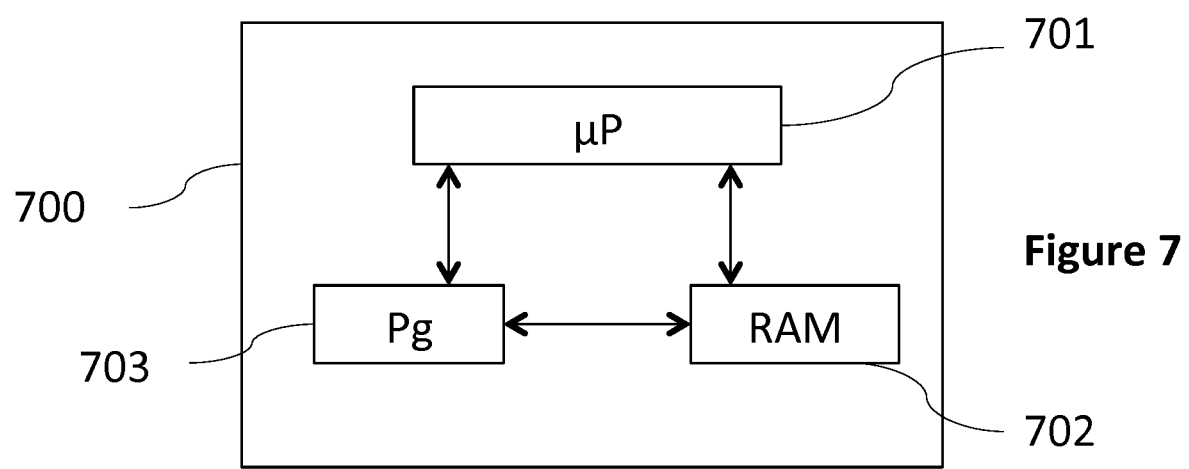

FIG. 7 presents an example of a device that can be used to control the performance of an optical device according to one embodiment of the disclosure.

The components in the figures are not necessarily to scale, emphasis instead being placed upon illustrating the principles of the invention. Throughout the description, the same reference numerals are used to designate the same elements.

5. DETAILED DESCRIPTION

The general principle of the present disclosure relies on an angular-selective metasurface device capable of providing at least two different optical functions for at least two different illumination conditions.

Figure 1:
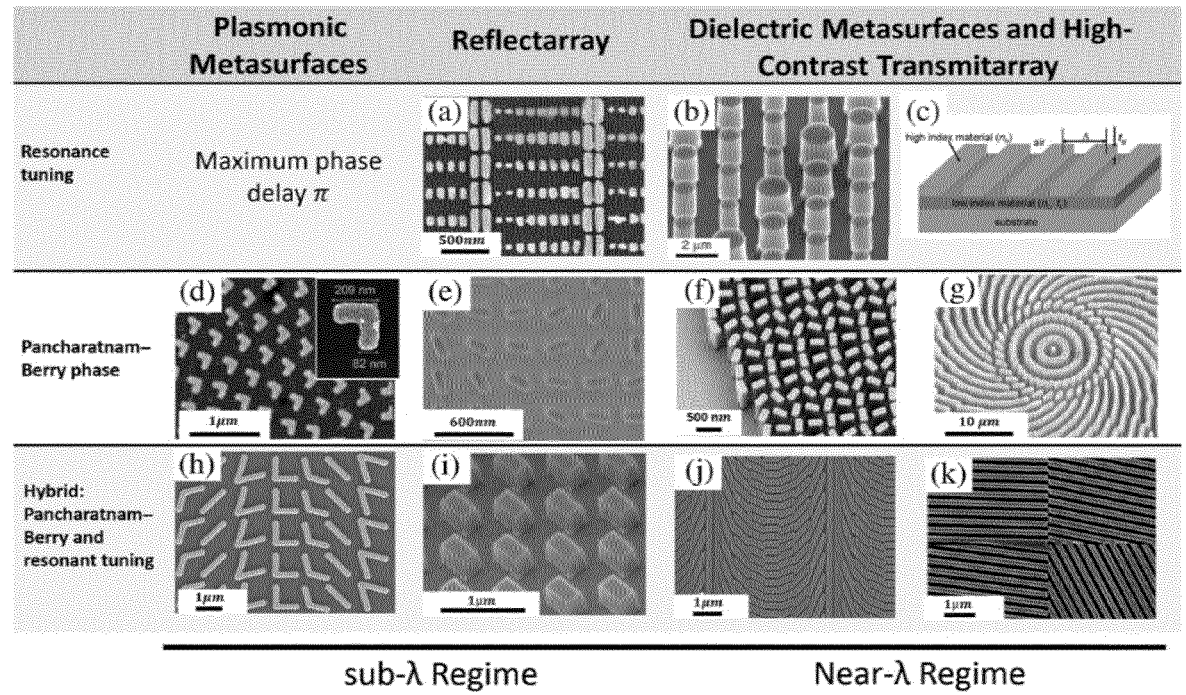

As an introduction to the description of embodiments of the present disclosure, FIG. 1 gives examples of different solutions proposed to address wavefront control with metasurface devices from the prior art. In the top panel of FIG. 1, from (a) to (c), the optical response of the nanostructures is tailored by changing the geometry of each individual resonator forming the metasurface. In the middle panel of FIG. 1, from (d) to (g), metasurfaces based on the Pancharatnam-Berry (PB) phase present very high scattering efficiencies, both in reflection and in transmission. The bottom panel of FIG. 1, from (h) to (k) shows hybrid metasurfaces, that work by using both resonant tuning and PB phase tuning.

In these examples, the subwavelength optical elements may consist in metallic strips having different shape and orientation (see FIGS. 1 (a), (d) and (h)), or in sub-wavelength dielectric cylinders with a circular or rectangular cross-section having variable size and/or orientation (see FIG. 1 (b), (e) to (g)), or take the form of strips creating 1D array (see FIG. 1 (c), (k)).

Figure 2A:
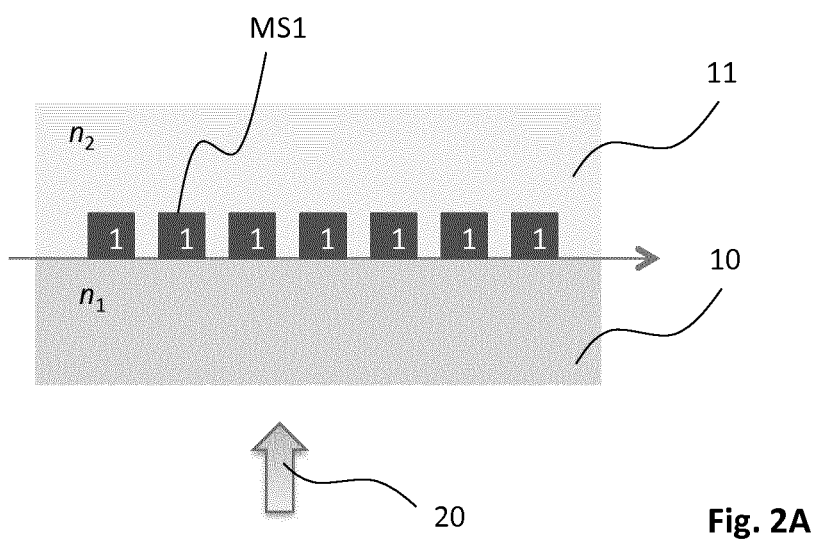

FIG. 2A gives a schematic drawing of the side view of such a prior art metasurface device comprising a regular array of subwavelength optical elements with all elements belonging to a same set. It must be noted that, in the schematic drawing of FIG. 2A, all subwavelength optical elements are identical, while in the previous example of FIG. 1, the elements are not identical (varying in size, shape, orientation . . . to locally vary the phase of the incident wave) but however belong to a same set of elements.

The metasurface MS1 is formed of a regular array of subwavelength optical elements 1, assembled on the surface of a substrate 10 with a refractive index $n_1$. The subwavelength optical elements 1 are immersed in a host medium 11 with a refractive index $n_2$.

Figure 2B:
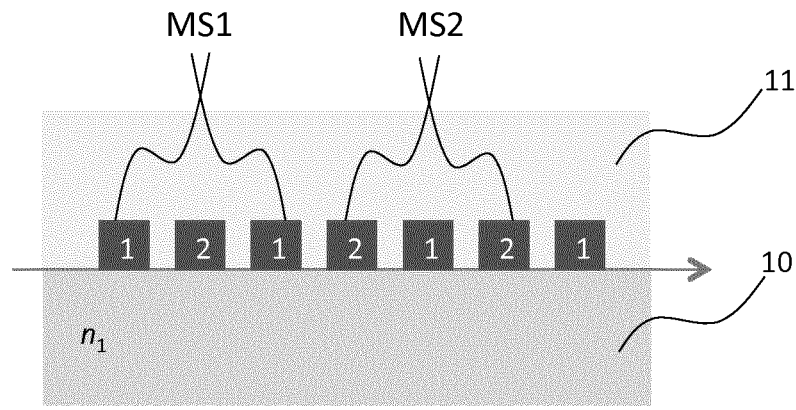

The metasurface devices of FIGS. 2A and 2B are illuminated by an incident EM wave which propagation direction is illustrated by arrow 20.

FIG. 2B illustrates a compound metasurface comprising two subwavelength optical element arrays MS1 and MS2: each subwavelength optical element array comprises a plurality of subwavelength optical elements of a same type, or belonging to a same set. The compound metasurface thus comprises subwavelength optical elements, respectively referenced 1 and 2, belonging to two different sets. Among a given set (1 or 2), the subwavelength optical elements may be identical or not. The subwavelength optical elements 1, 2 are assembled on the surface of a substrate 10 with a refractive index $n_1$. They are immersed in a host medium 11 with a refractive index $n_2$. Subwavelength optical elements 1 and 2 alternate on the surface of the substrate 10, so that each subwavelength optical element 1 of the first type of subwavelength optical elements is directly surrounded by two subwavelength optical elements 2 of the second type of subwavelength optical elements, and inversely.

Figure 2C:
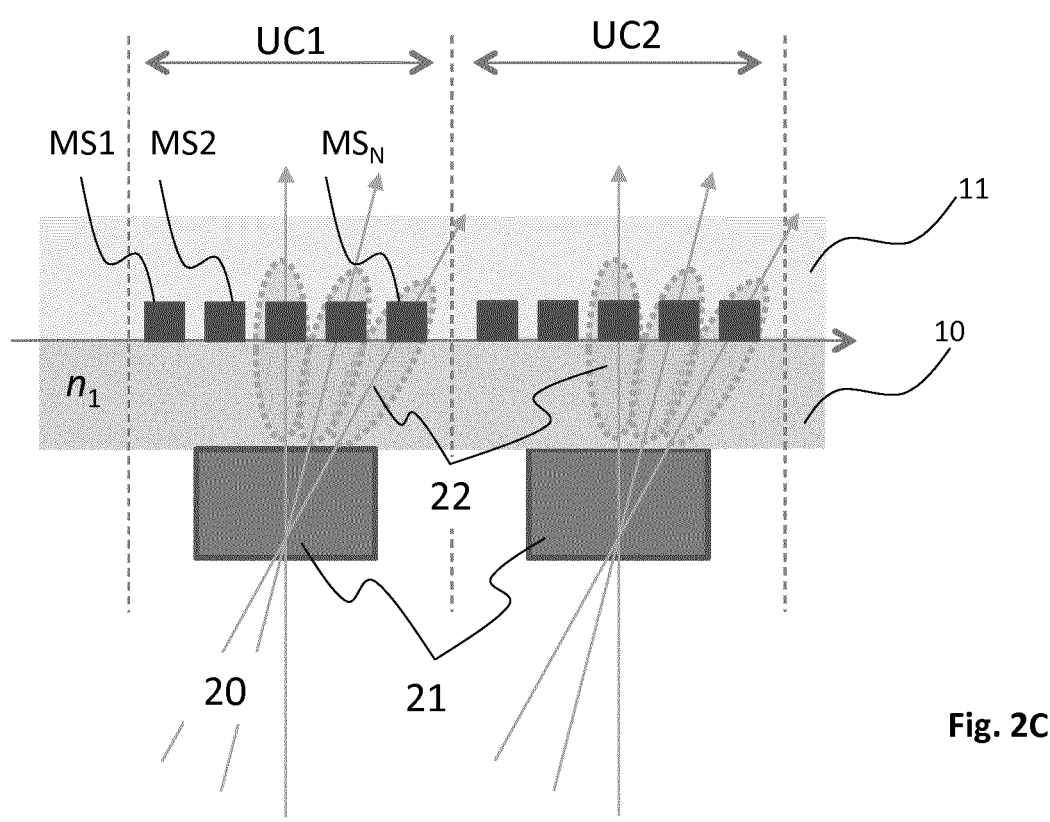

FIG. 2C provides a schematic drawing of an optical device according to an embodiment of the present disclosure.

On the exemplary drawing of FIG. 2C, two unit cells UC1 and UC2 are represented. The optical device may comprise an array of unit cells $UC_i$, which may either be one-dimensional (as illustrated on the side view of FIG. 2C), or two-dimensional, on a XY-plane. Each unit cell UC1, UC2, comprises Light-Guiding Element 21, which receives incident electromagnetic waves 20, with different angles of incidence.

Such LGE 21 may be any type of focusing device, such as a well-known refractive or diffractive lens, or, in a peculiar embodiment, which will be described in more details hereafter, a nanojet microlens. It might actually be beneficial to use a nanojet lens to get the smallest size of a unit cell.

Such LGE 21 are placed below the bottom surface of a substrate 10 with refractive index $n_1$. The top surface of the substrate 10 carries subwavelength optical elements referenced 1 to N.

Each unit cell UC1, UC2 comprises an array of N subwavelength optical elements, each belonging to a different set MSi (i ranging from 1 to N) of subwavelength optical elements. Each set MSi is characterized by a peculiar optical response to an incident wave. For example, each set MSi may induce a different angle of deviation of the electromagnetic wave incident on the optical device, defined with respect to the propagation direction of the incident EM wave, when the subwavelength optical elements of this set are selectively illuminated.

In the example of FIG. 2C, each unit cell UCi thus comprises N subwavelength optical elements 1 to N belonging to N different sets of subwavelength optical elements MS1 to $MS_N$. These elements are placed in a focal plane of the LGE 21.

The LGE 21 act as focusing elements, which generate optical beams 22 in response to the incoming incident waves 20. The optical beams 22 selectively excite the subwavelength optical elements of a given set MSi. As the LGE 21 are identical for all unit cells, the subwavelength optical elements of a same set are excited simultaneously in all unit cells of the optical device.

In the example of FIG. 2C, such an optical device may hence perform N different optical functions, corresponding to the N optical responses of the N different sets of subwavelength optical elements.

Figure 3:
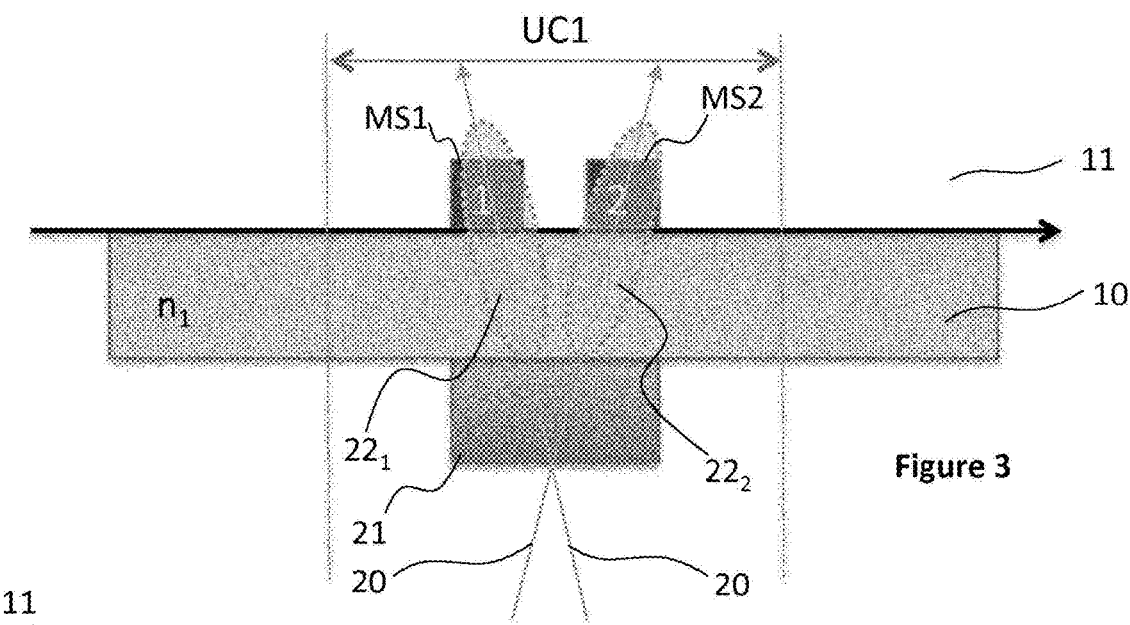

In a simpler embodiment, the number of sets of subwavelength optical elements in a unit cell UCi may be limited to two, namely MS1 with subwavelength optical element 1 and MS2 with subwavelength optical element 2; the optical device may comprise only one unit cell UC. This is illustrated in FIG. 3. Depending on the angle of incidence of the electromagnetic wave 20 on the LGE 21, the latter focuses light either in an optical beam $22_1$, which selectively excites the subwavelength optical element 1 belonging to metasurface MS1, or in an optical beam $22_2$ which selectively excites the subwavelength optical element 2 belonging to metasurface MS2.

Figure 5:
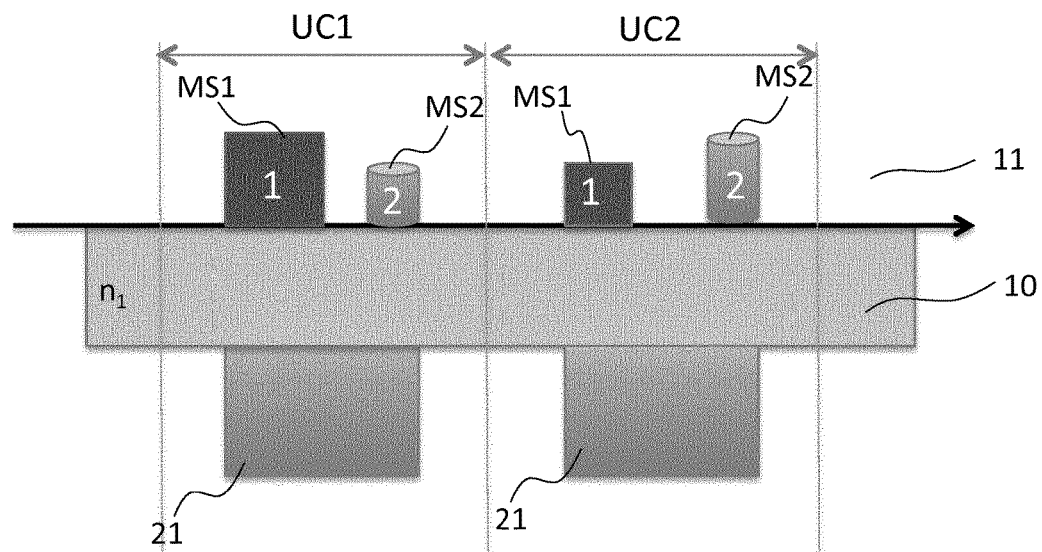
FIG. 5 illustrates an alternate embodiment of an optical device according to the present disclosure, made of unit cells which are not identical.

In another embodiment, illustrated by FIG. 5, the optical device comprises several unit cells, each comprising subwavelength optical elements belonging to the same sets of subwavelength optical elements, but which may not be identical.

More precisely, each unit cell UC1 and UC2 comprises two subwavelength optical elements referenced 1 and 2, each belonging to a different set of subwavelength optical elements MS1 and MS2. However, unit cells UC1 and UC2 are not identical, as the elements of each array MS1 and MS2 are not identical throughout the cells (though belonging to the same set of subwavelength optical elements). In the simple example of FIG. 5, the subwavelength optical elements differ in size from one unit cell to the other: the nanoparticle 1 belonging to the set MS1 is bigger in unit cell UC1 than in unit cell UC2, while the nanoparticle 2 belonging to the set MS2 is smaller in unit cell UC1 than in unit cell UC2. The optical response of the nanoparticles of a given set MS1 or MS2 remains the same in type (e.g. phase delay), though it may differ in magnitude, thus resulting in a different shape of the wavefront of the outgoing wave.

In a preferred embodiment, to enable the desired selective excitation of subwavelength-size nanoparticles, or subwavelength optical elements, by means of LGEs, the LGEs 21 are nanojet microlenses. It is recalled that such nanojet microlenses were first presented in PCT patent applications PCT/EP17/057130 and PCT/EP17/057131, which were not published at the time of filing the present patent application.

The key features of NJ microlenses important for implementation of the compound metasurface of the present disclosure are recalled below:

- NJ microlenses can be made of a homogeneous dielectric with a refractive index higher than that of a host medium. As an alternative, it can be created in a form of a hollow ring, as described in PCT patent application PCT/EP17/057130 or a set of arbitrary-shaped cavities as described in PCT patent application PCT/EP17/057131.
- NJ microlenses may have a form of dielectric cylinders (or cones, or prisms) with an arbitrary cross-section.
- their diameter (i.e. cross-sectional dimension in a plane orthogonal to an incident wave propagation direction) and height (i.e. size of the cylinder along the incident wave propagation direction) may vary in between about ½ to a few wavelengths.
- NJ microlenses can produce condensed optical beams in the near zone (so-called nanojet beams), whose length and half power beam width (BWHP) can be tuned by varying lens material, shape, and size. More specifically, the shape of the NJ beam depends on the shape and curvature of the base edge line as well as the cylinder (prism, cone) base angle. Depending on the lens topology, axis of the NJ beam may coincide with the lens axis and propagation direction of the incident light or may not, as described in European patent application EP16306387.8 (not yet published at the time of filing the present patent application).

As a complement to the NJ beam formation, NJ microlenses can also produce a quiet zone, which is a zone characterized with very low field intensity values, much lower than that of the incident wave, as described in European patent application EP16306386.0 (not yet published at the time of filing the present patent application).

The typical values of the NJ beam width at half power for a cylindrical NJ microlens is about ½ of the incident wavelength.

The length of the NJ beam may vary from a few to several (e.g. 10 and more) wavelengths.

In case of an incline incidence of the incoming light (i.e. propagation direction does not coincide with the cylinder optical axis and/or is not normal to the cylinder base surface), NJ beam may also tilt in accordance with the incoming light incident angle. The same behavior is observed for the quiet zone.

Figure 4A:
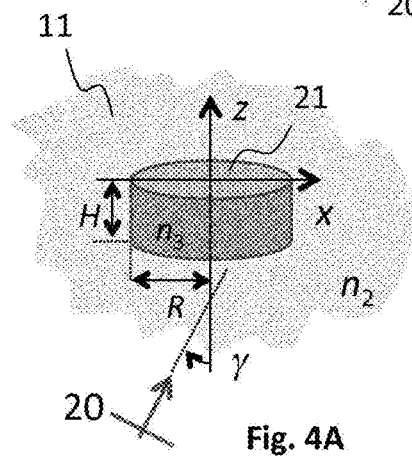
FIGS. 4A to 4C illustrate the power density in the near zone of a cylindrical NJ microlens illuminated by unit-amplitude linearly-polarized plane wave $\vec{E}=\{0, E_y, 0\}$ incident from below.
Figure 4B:
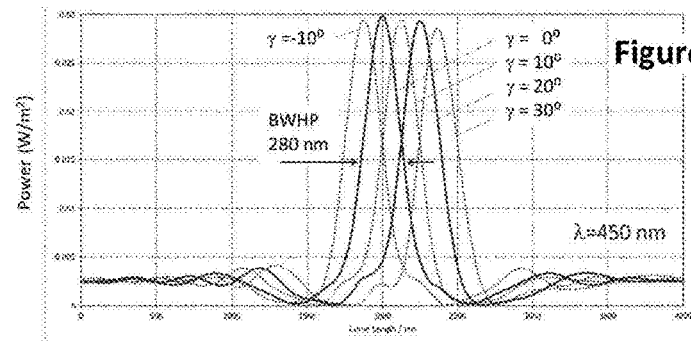
Figure 4C:
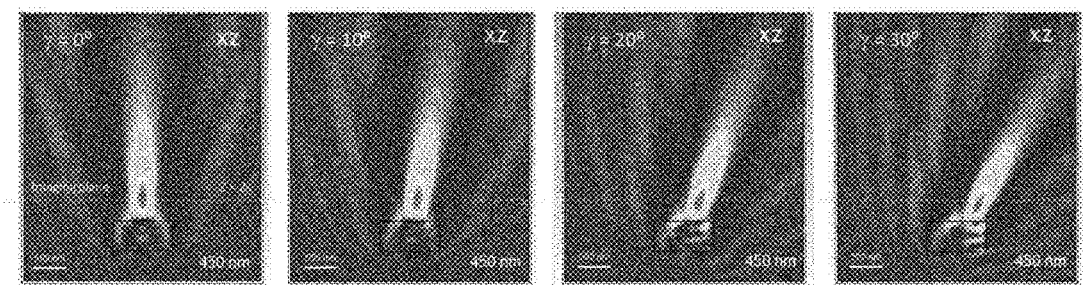

This performance is illustrated in FIG. 4C.

FIG. 4 actually illustrates the power density in the near zone of a cylindrical NJ microlens 21 illuminated by unit-amplitude linearly-polarized plane wave $\vec{E}^i = \{0, E_y, 0\}$ incident from below, with:
- $n_2 = 1$ is the refractive index of the host medium surrounding the NJ microlens 21,
- $n_3 = 1.5$ is the refractive index of the NJ microlens 21,
- R=500 nm is the radius of the cylindrical NJ microlens 21,
- H=500 nm is the height of the cylindrical NJ microlens 21.

More precisely, FIG. 4A provides the topology and notations used for the NJ microlens 21, FIG. 4B provides the power density profile along x-axis in a focal plane at z=z0, and FIG. 4C provides the power density distribution in xz-plane for different incident angles of the plane wave.

As may be observed on FIG. 4A-4C, for an exemplary embodiment of a cylindrical NJ microlens 21, the shape of the NJ beam, as well as its peak intensity, are well preserved for different incident angles γ of a linearly-polarized plane wave, up to at least 30°. From left to right, the different drawings of FIG. 4C respectively correspond to an angle of incidence of the linearly-polarized plane wave of γ=0°, γ=10°, γ=20° and γ=30°.

To enable a selective excitation of two neighboring subwavelength optical elements in a compound metasurface device, at least a factor of two difference in terms of field intensity is recommended for the illuminated and non-illuminated subwavelength optical elements. As may be observed on FIG. 4B, for the selected exemplary NJ microlens 21, this condition is satisfied for γ=0° and γ=20° for example. It is also satisfied for γ=−10°, γ=10° and γ=30°.

In other words, it is possible with such a nanojet microlens 21 to selectively excite subwavelength optical elements 1 of a first set MS1 with an electromagnetic wave reaching the NJ microlens 21 with an angle of incidence of γ=0°, and to selectively excite subwavelength optical elements 2 of a second set MS2 with an electromagnetic wave reaching the NJ microlens 21 with an angle of incidence of γ=20°. It is thus possible to form an angular-selective metasurface device capable of providing two different optical functions for two different angles of incidence of the incoming light.

It would also be possible with such a nanojet microlens 21 to selectively excite subwavelength optical elements 1 of a first set MS1 with an electromagnetic wave reaching the NJ microlens 21 with an angle of incidence of γ=−10°, to selectively excite subwavelength optical elements 2 of a second set MS2 with an electromagnetic wave reaching the NJ microlens 21 with an angle of incidence of γ=10°, and to selectively excite subwavelength optical elements 3 of a second set MS3 with an electromagnetic wave reaching the NJ microlens 21 with an angle of incidence of γ=30°. It is thus possible to form an angular-selective metasurface device capable of providing three different optical functions for three different angles of incidence of the incoming light. Although not shown on the figures, a fourth subwavelength optical element, belonging to a fourth set, could also be added and selectively excited for an incident angle of −30° (as follows by symmetry), thus allowing to achieve an optical device capable of providing four different optical functions.

Figures 6A, 6B, 6C, 6D:
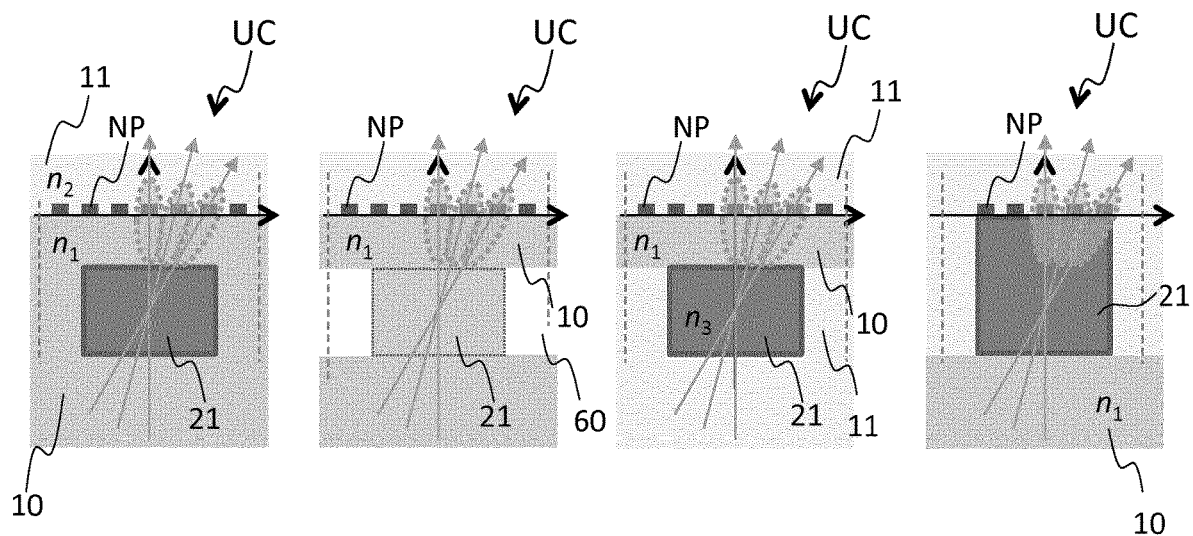
FIGS. 6A to 6D illustrate a few exemplary embodiments for a unit cell of an optical device according to the present disclosure.

A few exemplary embodiments for a unit cell of an optical device according to the present disclosure are illustrated in FIG. 6. In these examples, an arbitrary number of subwavelength optical elements is shown for each unit cell (namely seven in FIGS. 6A, 6B, 6C and five in FIG. 6D). It is recalled however that in the simplest case, a unit cell comprises only two subwavelength optical elements belonging to two different sets of subwavelength optical elements.

The unit cell UC in the embodiment of FIG. 6A comprises a set of subwavelength optical elements NP made of a high-index ($n_4$) dielectric material assembled on a surface of a dielectric substrate 10 with refractive index $n_1$. The subwavelength optical elements NP are surrounded by a host medium 11 with refractive index $n_2 < n_4$. The substrate 10 comprises a LGE 21 in a form of a cylindrical NJ microlens made of a dielectric material with refractive index $n_3$ higher than that of the substrate $n_1$. The LGE 21 is placed in the center of the unit cell UC at a certain distance below the surface of the substrate 10 on which the subwavelength optical elements NPs are assembled.

Once again, the man skilled in the art could also replace the NJ microlens 21 with a classical refractive or diffractive lens, though not illustrated.

The unit cell UC in the embodiment of FIG. 6B is similar to that of FIG. 6A except for the part related to the LGE 21. In this embodiment, the LGE 21 is made of the same material as the substrate 10, with refractive index $n_3 = n_1$, and the focusing function of the LGE 21 is enabled by creating one (as in PCT patent application PCT/EP17/057130) or several (as in PCT patent application PCT/EP17/057131) cavities 60. The cavity(ies) 60 are filled with a medium with a refractive index $n < n_3$. A set of subwavelength optical elements NP made of a high-index ($n_4$) dielectric material are assembled on the surface of the dielectric substrate 10. The subwavelength optical elements NP are surrounded by a host medium 11 with refractive index $n_2 < n_4$. Once again, the NJ microlens 21 may be replaced with a refractive lens, or a diffractive lens of any type.

The unit cell UC in the embodiment of FIG. 6C is similar to that of FIG. 6A except for the position of the LGE 21. In this embodiment, the NJ microlens 21 is attached to a thin substrate 10 with refractive index $n_1$, whose opposite surface supports the NP array. The lens material refractive index can be selected arbitrarily, provided it is higher than that $n_2$ of the host medium 11. In one embodiment, it may have the same value as the substrate, i.e. $n_1$. Once again, the NJ microlens 21 may be replaced with a refractive lens, or a diffractive lens of any type.

The unit cell UC in the embodiment of FIG. 6D may comprise the same type of subwavelength optical elements NP as in FIG. 6A-6C, but its elements NP are assembled directly on the top surface of the NJ lens 21, having a form of a cylinder, whose height is increased (compared to other embodiments) up to the value, which results in the creation of hot spots directly on the top surface of the cylinder 21. The nanojet microlens 21 may be attached to the top surface of a substrate 10 with refractive index $n_1$. In one embodiment, the nanojet microlens 21 can be made of the same material as the substrate 10.

In all aforementioned embodiments, subwavelength optical elements NP can be arranged in 1D or 2D arrays, whose layout is to be optimized with respect to the illumination conditions and desired optical response.

In yet another embodiment (not shown), the optical device according to the present disclosure may comprise a compound metasurface comprising a dielectric substrate with bars or grooves created on its surface having different width/height/shape acting as 2D subwavelength elements and/or 2D nanojet microlenses.

More complex shapes of NJ microlenses, adapted for specific illumination conditions and/or layout of the compound metasurface may also be used, e.g. in a form a N-order gears, flowers, or curved lines, as described for example in European patent application EP 16306387.8.

The compound metasurface of the optical device according to embodiments of the present disclosure can be fabricated using established nano-fabrication methods, such as UV/DUV/E-beam lithography.

FIG. 7 presents an example of a device that can be used to control the performance of an optical device according to one embodiment of the disclosure.

Such a device referenced 700 comprises a computing unit (for example a CPU, for "Central Processing Unit"), referenced 701, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 702. Computer programs are made of instructions that can be executed by the computing unit. Such a device 700 can also comprise a dedicated unit, referenced 703, constituting an input-output interface to allow the device 700 to communicate with other devices. In particular, this dedicated unit 703 can be connected with an antenna (in order to perform communication without contacts), with light source/receiving unit (such as for example a photodiode, optical fiber, detector, e.g. photodiode, etc.) or with serial ports (to carry communications "contact"). It should be noted that the arrows in FIG. 7 signify that the linked units can for example exchange data together through buses.

In an alternate embodiment, control of the performance of a device according to one embodiment of the disclosure can be implemented in hardware in a programmable FPGA ("Field Programmable Gate Array") component or ASIC ("Application-Specific Integrated Circuit") component.

The invention claimed is:

1. An optical device forming an outgoing electromagnetic wave from an incident electromagnetic wave, wherein the optical device comprises at least one unit cell (UC; UC1, UC2), said unit cell comprising:

at least two subwavelength optical elements (1, 2, ..., N), each of them belonging to a different set (MS1, MS2, ..., $MS_n$) of subwavelength optical elements, a set of subwavelength optical elements being characterized by a type of optical response to an incident electromagnetic wave; and a nanojet microlens (21) enabling selective excitation of the subwavelength optical elements belonging to a given set, in response to said electromagnetic wave (20) incident on said unit cell.

2. The optical device of claim 1, wherein the type of optical response belongs to the group comprising:

a phase shift applied to said incident electromagnetic wave and, an amplitude change of at least part of a spectrum of said incident electromagnetic wave.

3. The optical device of claim 1, wherein said subwavelength optical elements (NP) belong to the group comprising:

metallic particles;

dielectric particles;

semiconductor particles;

optical resonators; and optical antennas.

4. The optical device of claim 1, wherein said subwavelength optical elements are assembled on or inside a dielectric substrate (10).

5. The optical device of claim 4, wherein said nanojet microlens is a nanojet microlens embedded in said substrate and made of a dielectric material with refractive index higher than that of said substrate.

6. The optical device of claim 4, wherein said nanojet microlens is placed at a distance below a surface of said substrate on which said subwavelength optical elements are assembled.

7. The optical device of claim 4, wherein said substrate comprises at least one cavity filled with a medium with refractive index lower than that of said substrate and wherein said nanojet microlens is formed in the same material as said substrate and has a focusing function enabled by a step of refractive index induced by an edge of said cavity.

8. The optical device of claim 4, wherein said nanojet microlens is attached to a surface of said substrate opposite to a surface of said substrate on which said subwavelength optical elements are assembled, and wherein said optical device comprises a host medium surrounding said nanojet microlens and having a refractive index lower than that of said nanojet microlens.

9. The optical device of claim 4, wherein said nanojet microlens forms said substrate on a surface of which said subwavelength optical elements are assembled.

10. The optical device of claim 1, wherein the optical device comprises a one-dimensional or two-dimensional array of unit cells.

11. The optical device of claim 8, wherein said unit cells of said array of unit cells comprise subwavelength optical elements belonging to the same sets of subwavelength optical elements but which are not identical.

12. The optical device of claim 1, wherein the optical device belongs to an eyewear optical device or a display device.

13. The optical device of claim 1, wherein said subwavelength optical elements are in a focal plane of said nanojet microlens.

14. The optical device of claim 1, wherein the nanojet microlens enables selective excitation of all subwavelength optical elements belonging to a given set, in response to said electromagnetic wave incident on said unit cell.

15. An apparatus comprising:
a plurality of nanojet microlenses; and
for each of the nanojet microlenses, at least a first subwavelength optical element and a second subwavelength optical element, the second subwavelength optical element being different from the first subwavelength optical element;
wherein the first and second subwavelength optical elements are arranged such that the first subwavelength optical elements are selectively illuminated for a first incident angle of an incident electromagnetic wave and the second subwavelength optical elements are selectively illuminated for a second incident angle of the incident electromagnetic wave.

16. The apparatus of claim 15, wherein the plurality of nanojet microlenses and the first and second subwavelength optical elements are provided on a common substrate.

17. The apparatus of claim 15, wherein the second subwavelength optical element differs from the first subwavelength optical element in an amount of phase shift applied to the incident electromagnetic wave.

18. The apparatus of claim 15, wherein the second subwavelength optical element differs from the first subwavelength optical element in an amount of amplitude change of at least part of a spectrum of the incident electromagnetic wave.

19. The apparatus of claim 15, wherein the first and second subwavelength optical elements comprise nanoparticles.

20. The apparatus of claim 15, wherein the first subwavelength optical element comprises a first nanoparticle and the second subwavelength optical element comprises a second nanoparticle having a size different from the first nanoparticle.

* * * * *